(12) United States Patent
Abe

(10) Patent No.: US 7,019,857 B2
(45) Date of Patent: Mar. 28, 2006

(54) INFORMATION PROCESSING APPARATUS, INFORMATION PROCESSING METHOD, STORAGE MEDIUM, AND PROGRAM

(75) Inventor: Koichi Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 09/819,666

(22) Filed: Mar. 29, 2001

(65) Prior Publication Data

US 2001/0035983 A1  Nov. 1, 2001

(30) Foreign Application Priority Data

Mar. 30, 2000 (JP) .............................. 2000-095339
Mar. 14, 2001 (JP) .............................. 2001-072630

(51) Int. Cl.
*G06F 15/00* (2006.01)
*G06F 3/00* (2006.01)

(52) U.S. Cl. ........................ 358/1.15; 399/79; 710/15

(58) Field of Classification Search ............... 358/1.13, 358/1.15, 518, 474; 347/19, 54, 19.54, 14; 709/223, 229; 399/79, 90; 710/15, 263

See application file for complete search history.

(56) References Cited

U.S. PATENT DOCUMENTS 5,768,483 A * 6/1998 Maniwa et al. ............ 358/1.15

* cited by examiner

*Primary Examiner*—Kimberly Williams
*Assistant Examiner*—Saeid Ebrahimi-Dehkordy
(74) *Attorney, Agent, or Firm*—Fitzpatrick, Cella, Harper & Scinto

(57) ABSTRACT

This invention relates to an image processing apparatus which is connected to image input and output devices via a communication medium, an image processing method, a storage medium, and a program. According to this invention, input setting information and output setting information corresponding to an image processing mode selected by the operator are acquired from those pre-stored in a memory, an image input process of the image input device is controlled on the basis of the acquired input setting information, and an image output process of the image output device is controlled on the basis of the acquired output setting information, thus obtaining a high-quality image processing result by simple operation.

51 Claims, 11 Drawing Sheets

⇔ INDICATES ADDRESS AND DATA BUSES

FIG. 5

| COPY PURPOSE | SCAN SETUP ||| RECORDING (PRINT) SETUP ||||
| --- | --- | --- | --- | --- | --- | --- |
| | SCAN METHOD | SCAN RESOLUTION(dpi) | PRINT METHOD | PRINT RESOLUTION(dpi) | PRINT MEDIUM | PRINT QUALITY |
| DTP(COLOR) | COLOR | 180×180 | COLOR | 360×360 | NORMAL PAPER | STANDARD |
| DTP(MONOCHROME) | GRAYSCALE | 180×180 | GRAYSCALE | 360×360 | NORMAL PAPER | STANDARD |
| PHOTO | COLOR | 360×360 | COLOR | 360×360 | HIGH-QUALITY EXCLUSIVE PAPER | HIGH QUALITY |
| FAX | MONOCHROME | 200×200 | MONOCHROME | 360×360 | NORMAL PAPER | STANDARD |
| OCR | MONOCHROME | 360×360 | MONOCHROME | 360×360 | NORMAL PAPER | STANDARD |
| TEXT | MONOCHROME | 180×180 | MONOCHROME | 360×360 | NORMAL PAPER | STANDARD |

INFORMATION PROCESSING APPARATUS, INFORMATION PROCESSING METHOD, STORAGE MEDIUM, AND PROGRAM

FIELD OF THE INVENTION

The present invention relates to an image processing apparatus which is connected to image input and output devices via a communication medium, an image processing method, a storage medium, and a program and, more particularly, to an image processing apparatus for controlling an image process for outputting an image input by the image input device using the image output device, e.g., an image copy process, an image processing method, a storage medium, and a program.

BACKGROUND OF THE INVENTION

An image processing system in which a scanner device having a function of scanning an image, and a printer device having a function of printing image data are connected to a host computer such as a personal computer or the like via a communication medium is known. Especially, an image processing system that can print an image read by the scanner device using the printer device is called a copy system.

In the copy system, setups, control, and the like which pertain to image scan and print processes are done on the host computer. In recent years, a copy system that implements such setups, control, and the like by software called a copy application has been proposed. The copy application can display a user interface that displays a screen of copy information on a display of the host computer, and allows the operator to make copy operation on it. As for operations on the displayed user interface, a copy process can be done by simple operations, i.e., by setting the number of sets of copies and pressing a copy button.

However, to make operations easy, the conventional copy application makes setups of scan and print processes using predetermined setup values, and executes the scan and print processes based on these setup values. For this reason, images are copied with a given copy speed and copy image quality independently of the type of document.

Normally, in order to improve the quality of a copy image to be printed, an image must be scanned as high-resolution, high-quality, multi-valued data, and must be printed with high resolution and high quality. For this reason, the data size to be processed increases, and the copy speed drops considerably. In order to improve the print speed, since an image must be scanned as low-resolution, low-quality, binary data, and must be printed with low resolution and low quality, the quality of the copy image to be printed deteriorates considerably.

Therefore, in the conventional copy system, upon determining the predetermined setup values, the quality of the copy image to be printed and the copy speed are balanced to set intermediate values. That is, setup values of the scan process are set to obtain middle-resolution, standard-quality, multi-valued data, and setup values of the print process are set to obtain a middle-resolution, standard-quality image.

For this reason, for example, when a text document is simply copied, a copy time longer than that required for copying a single document image is required. When a color photo is copied, the quality of the printed image is considerably lower than the original color photo.

To prevent such increase of copy time or deterioration of picture quality, setups of the scan and print processes corresponding to a document to be copied can be done. However, in the conventional copy application, setups of the scan process are made on a user interface displayed by a scanner driver for driving the scanner device, and setups of the print process are made on a user interface displayed by a printer driver for driving the printer device.

That is, a problem arises in that the user must make complicated operations to merely copy, resulting in very poor operability. Furthermore, the user may set wrong values of the scan or print process, i.e., cannot often set setup values he or she really wanted to set. In this case, a problem arises in that the copy speed may become excessively low, or the printed copy image may have inadvertently poor quality.

SUMMARY OF THE INVENTION

The present invention has been made to solve the aforementioned problems, and has as its object to provide an information processing apparatus which can obtain a high-quality image processing result by simple operations, an image processing method, a storage medium, and a program.

It is another object of the present invention to provide an information processing apparatus which can execute an image process at an appropriate processing speed by simple operations, an image processing method, a storage medium, and a program.

As means for achieving the above objects, the present invention comprises the following arrangement.

That is, an information processing apparatus which is connected to an image input device and image output device via a communication medium, comprises input control means for controlling an image input process by the image input device, output control means for controlling an image output process by the image output device, storage means for storing a plurality of image processing modes, and input setup information and output setup information corresponding to the plurality of image processing modes, and acquisition means for acquiring the input setup information and output setup information corresponding to the image processing mode selected by an operator from the storage means, wherein the input control means controls the image input process of the image input device on the basis of the input setup information acquired by the acquisition means, and the output control means controls the image output process of the image output device on the basis of the output setup information acquired by the acquisition means.

It is still another object of the present invention to provide an information processing apparatus which can obtain image processing results that flexibly correspond to various device arrangements, an image processing method, a storage medium, and a program.

As means for achieving the above object, the present invention comprises the following arrangement.

That is, an information processing apparatus which is connected to an image input device and image output device via a communication medium, comprises generation means for generating a plurality of image processing modes from input setup information for controlling the image input device, and output setup information for controlling the image output device, storage means for storing the input setup information and the output setup information in correspondence with the plurality of image processing modes, and display means for displaying the plurality of image processing modes stored in the storage means.

It is still another object of the present invention to provide a storage medium and program which can obtain a high-quality copy result by simple operations.

It is still another object of the present invention to provide a storage medium and program which can execute a copy process at an appropriate processing speed by simple operations.

As means for achieving the above object, the present invention comprises the following arrangement.

That is, a computer readable memory which stores a program code of an image processing method which is implemented using a scanner driver and printer driver in a host computer which is connected to a scanner and printer via a communication medium, comprises a copy control code for controlling the scanner driver and printer driver, and controlling a user interface which is used to make a copy operation and display copy information, and a shared information storage code for storing, in a memory, setup information which is shared and used among the scanner driver, the printer driver, and the copy control code.

It is still another object of the present invention to provide a storage medium and program which can obtain a copy result that flexibly corresponds to the arrangement of a scanner and printer.

As means for achieving the above object, the present invention comprises the following arrangement.

That is, a computer readable memory which stores a program code of an image processing method which is implemented using a scanner driver and printer driver in a host computer which is connected to a scanner and printer via a communication medium, comprises a copy control code for controlling the scanner driver and printer driver, and controlling a user interface which is used to make a copy operation and display copy information, and a shared information storage code for storing, in a memory, setup information which is shared and used among the scanner driver, the printer driver, and the copy control code, wherein the copy control code controls to generate a plurality of copy modes from the setup information, and display the plurality of generated copy modes on the user interface in correspondence with the setup information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a table showing scan and recording (print) setup values of buttons 411 to 416 that represent copy purposes;

DETAILED DESCRIPTION OF THE PREFERRED EMBODIMENTS

Preferred embodiments of the present invention will be described hereinafter with reference to the accompanying drawings.

(First Embodiment)

Figure 1:
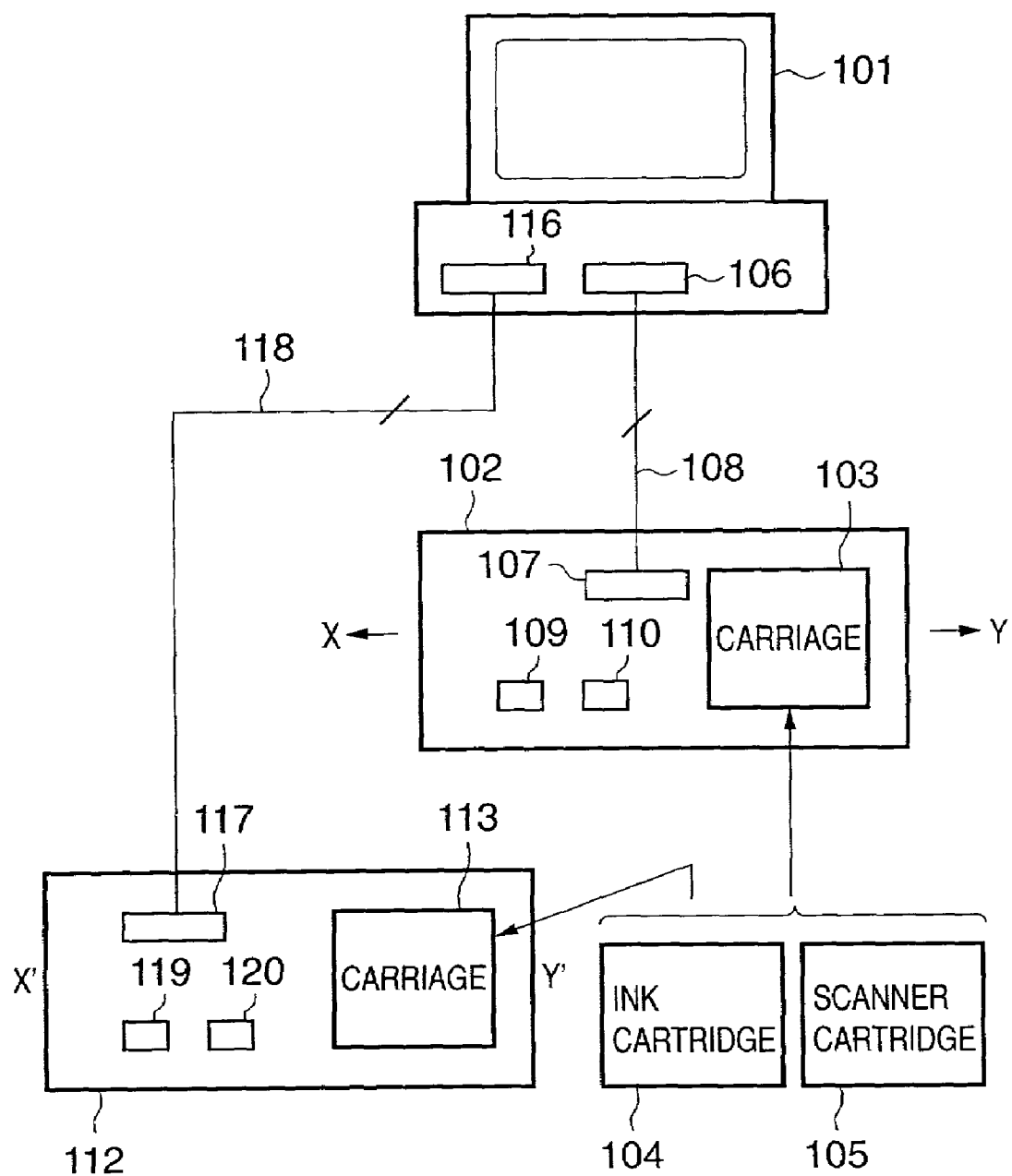
FIG. 1 is a block diagram showing the arrangement of a copy system according to the first embodiment of the present invention.

FIG. 1 is a block diagram showing the arrangement of a copy system according to the first embodiment. Referring to FIG. 1, reference numeral 101 denotes a personal computer, which will be explained as a display-integrated type in this example. Also, for example, Microsoft Windows 95 or 98 is installed as an OS. Reference numeral 102 denotes a printer, which is an ink-jet printer to which a head-integrated ink cartridge can be detachably attached. Reference numeral 103 denotes a carriage to which an ink cartridge 104 or scanner cartridge 105 can be attached. When the scanner cartridge 105 is attached to the carriage 103 in place of the ink cartridge 104, the printer 102 becomes a printer having a scanner function (to be referred to as a scanner printer 102 hereinafter). Reference numerals 106 and 107 denote bi-directional parallel interface ports, which allow bi-directional parallel communications between the personal computer 101 and scanner printer 102 via a parallel interface cable 108.

Reference numeral 109 denotes a cartridge exchange button, which is pressed upon exchanging the ink cartridge 104 or scanner cartridge 105. Upon depression of this button, the carriage 103 moves to a cartridge exchange position (not shown), and the user can freely exchange the cartridge in this state. Reference numeral 110 denotes a detection sensor which detects a print sheet or document. More specifically, the sensor 110 detects the presence/absence of a print sheet in a printer mode in which the ink cartridge 104 is mounted on the carriage 103, and the sensor 110 detects the presence/absence of a document in a scanner mode in which the scanner cartridge 105 is mounted on the carriage 103 (an identical sheet path is used).

Note that the carriage 103 moves in the X-Y directions in FIG. 1 to print/scan. In this embodiment, assume that the ink cartridge 104 is attached to the carriage 103.

Reference numeral 112 denotes a scanner printer having substantially the same arrangement as that of the scanner printer 102, except that the scanner printer 112 has a USB (Universal Serial Bus) interface. Also, the scanner printer 112 is an ink-jet printer to which the head-integrated ink cartridge 104 can be detachably attached. The ink cartridge 104 is attached to a carriage 113. When the scanner cartridge 105 is attached to the carriage 113 in place of the ink cartridge 104, the scanner printer 112 can provide a scanner function. Reference numerals 116 and 117 denote USB interface ports, which allow bi-directional communications between the personal computer 101 and scanner printer 112 via a USB interface cable 118.

Reference numeral 119 denotes a cartridge exchange button, which is pressed upon exchanging the ink cartridge 104 or scanner cartridge 105. Upon depression of this button, the carriage 113 moves to a cartridge exchange position (not shown), and the user can freely exchange the cartridge in this state. Reference numeral 120 denotes a detection sensor which detects a print sheet or document. More specifically, the sensor 120 detects the presence/absence of a print sheet in a printer mode in which the ink cartridge 104 is mounted on the carriage 113, and the sensor 120 detects the presence/absence of a document in a scanner mode in which the scanner cartridge 105 is mounted on the carriage 113 (an identical sheet path is used).

Note that the carriage 113 moves in the X'-Y' direction in FIG. 1 to print/scan. In this embodiment, assume that the scanner cartridge 105 is attached to the carriage 113.

Figure 2:
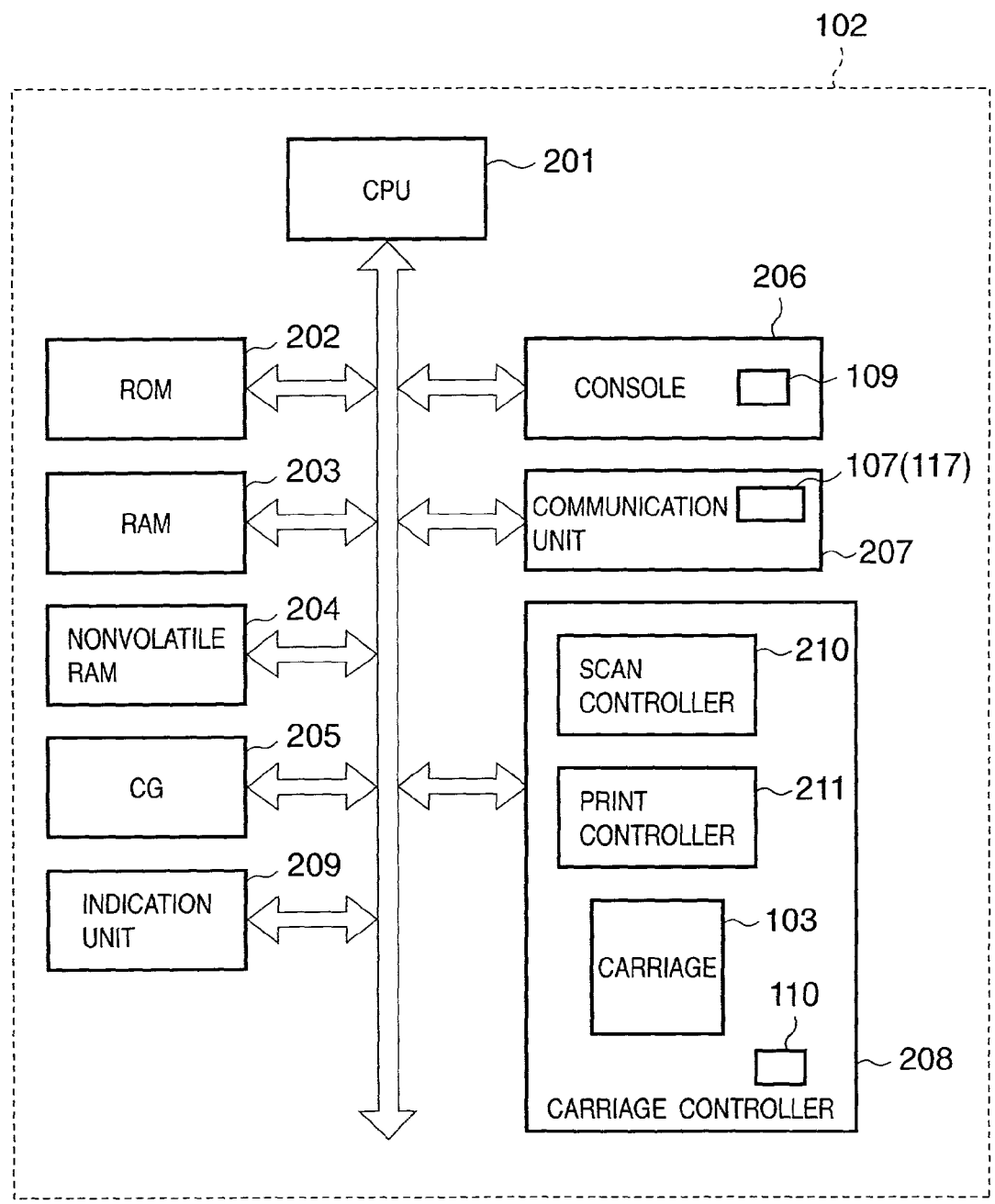
FIG. 2 is a block diagram showing the detailed arrangement of a scanner printer 102.

FIG. 2 is a block diagram showing the detailed arrangement of the scanner printer 102. Referring to FIG. 2, reference numeral 201 denotes a CPU which comprises a microprocessor and the like, and controls the overall printer in accordance with a program to be described later. Reference numeral 202 denotes a ROM which stores a program, control data, and the like for the CPU 201. Reference numeral 203 denotes a RAM which is a memory on which a work area, various tables, and the like used upon executing processes by the CPU 201 are defined. The RAM 203 also stores print data sent from the personal computer 101, or image data which is scanned via the scanner cartridge 105 under the control of a scan controller (to be described later), and is sent from a carriage controller.

Reference numeral 204 denotes a nonvolatile RAM, which can reliably store user data and other most important data to be saved (e.g., ink remaining amount data of the ink cartridge 104, and the like) even after the power supply (which is not shown in this embodiment) of the scanner printer 102 is turned off. Reference numeral 205 denotes a character generator (CG), which comprises a ROM that stores characters of JIS codes, ASCII codes, and the like, and various fonts, and outputs 1- or 2-byte character data corresponding to a predetermined code as needed under the control of the CPU 201.

Reference numeral 206 denotes a console which has a power switch, reset switch (neither are shown), the cartridge exchange button 109 (FIG. 1), and the like, and is freely operated by the user. Reference numeral 207 denotes a communication unit which includes the port 107 (117) shown in FIG. 1, and controls bi-directional parallel communications between the personal computer 101 and scanner printer 102 in conformity with IEEE P1284 as the standard of Standard Signaling Method for a Bi-directional Parallel Peripheral Interface for Personal Computers.

Reference numeral 208 denotes a carriage controller which controls the operation of a scan or print controller (to be described later) in accordance with the type of cartridge attached to the carriage 103. More specifically, whether the cartridge attached is the ink cartridge 104 or scanner cartridge 105 is determined by detecting an ID stored in the cartridge. When the ink cartridge 104 is mounted, a print controller (to be described later) controls print operation (printer mode); when the scanner cartridge 105 is mounted, a scanner controller (to be described later) controls scan operation (scanner mode). Reference numeral 209 denotes an indication unit which comprises an LED, buzzer, and the like (not shown) and informs the user of the state of the scanner printer 102 upon print or scan operation.

Reference numeral 210 denotes a scan controller which comprises a DMA controller, image processing IC, CMOS logic IC, and the like (not shown), converts data scanned using the scanner cartridge 105 into multi-valued or binary data under the control of the CPU 201, and sequentially sends the converted data to the RAM 203. Reference numeral 211 denotes a print controller which comprises a DMA controller, ink-jet print control IC, CMOS logic, and the like (not shown), and reads out print data stored in the RAM 203 and prints it out as a hard copy under the control of the CPU 201. Note that the carriage controller 208 includes the detection sensor 110 shown in FIG. 1 to detect the presence/absence of a print sheet or document, and controls the print or scan operation in accordance with the detection result.

Note that the scanner printer 112 shown in FIG. 1 has substantially the same arrangement as that of the scanner printer 102, except that the USB interface port 117 replaces the bi-directional parallel interface port 107 shown in FIG. 2, and a detailed description thereof will be omitted. The port 117 is included in the communication unit 207, which controls bi-directional communications between the personal computer 101 and scanner printer 112 in conformity with the standard of Universal Serial Bus (USB).

Figure 3:
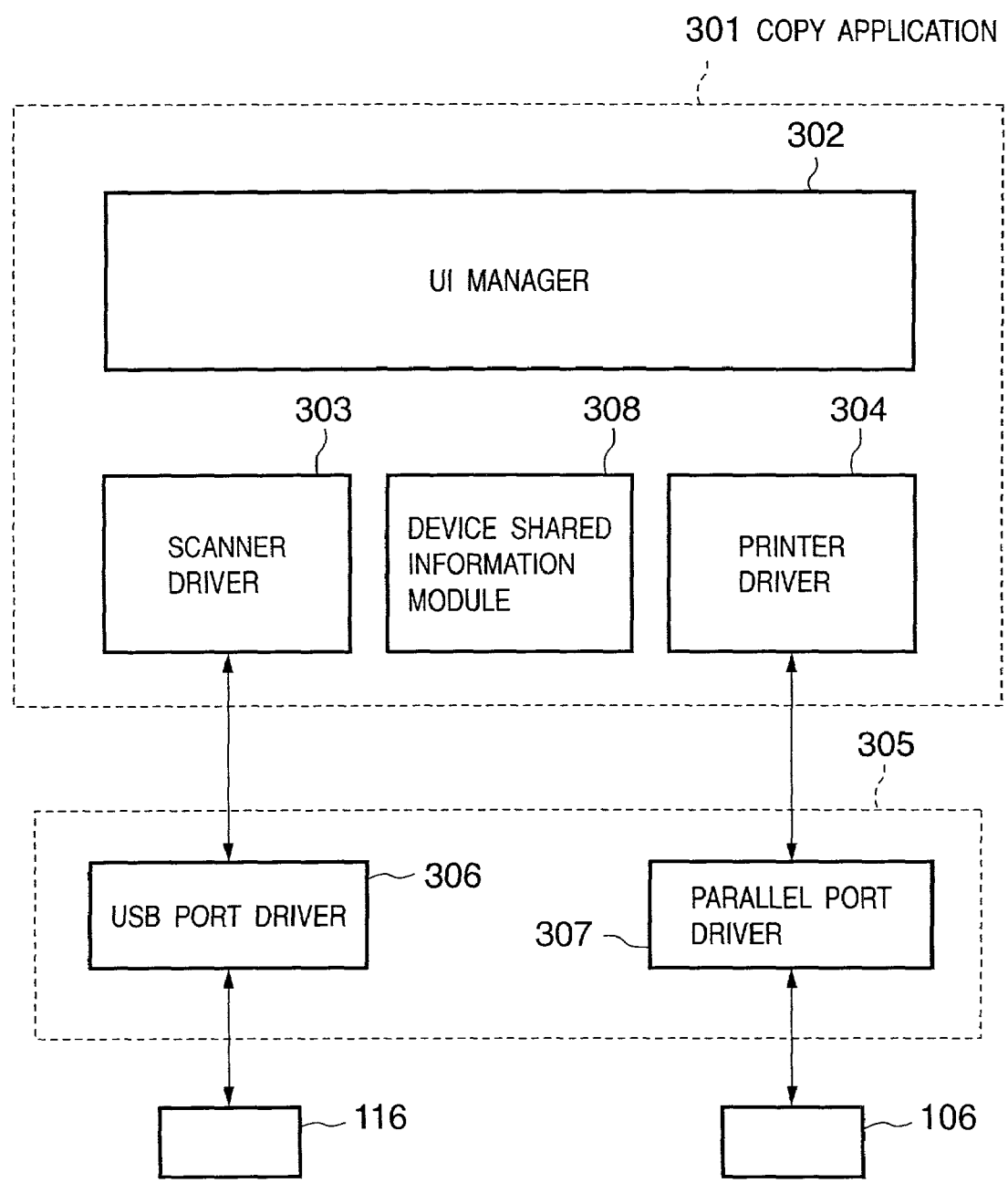
FIG. 3 is a block diagram showing the arrangement of a copy application.

FIG. 3 is a block diagram showing the arrangement of a copy application according to this embodiment. Note that the copy application is launched by the OS as an application on the personal computer 101. In general, the arrangement and operation for launching an application are known to those who are skilled in the art, and a detailed description thereof will be omitted.

In this embodiment, a program code of the copy application is supplied from a storage medium such as a CD-ROM or the like to the personal computer 101. However, the present invention is not limited to such specific medium. For example, when the personal computer 101 has a network function, it can download the program code from a predetermined device (server device or the like) located on the network to which it is connected.

The supplied program of the copy application is pre-stored in a hard disk drive (not shown) of the personal computer 101. Upon launching by the OS, the program of the copy application is executed, and modules shown in FIG. 3 are mapped on the RAM of the personal computer 101.

Referring to FIG. 3, reference numeral 301 denotes a copy application, which comprises a UI manager, scanner driver, and printer driver, as will be described in detail below. A scanner driver 303 controls a scan operation of an image using the scanner function of the scanner printer 112, an image process of the scanned image, and the like. A printer driver 304 controls a print operation, image process, and the like of an image using the printer function of the scanner printer 102. The scanner driver 303 and printer driver 304 are pre-stored in a storage device such as a hard disk or the like (not shown) in the personal computer 101. The copy application 301 can control the scanner printers 112 and 102 via the scanner driver 303 and printer driver 304, and has a function of copying a document image, and printing that image using the printer. Note that the setups upon executing the copy process will be described later.

Reference numeral 302 denotes a UI manager, which has an interface (a main dialog box to be described later) with the user, and controls it. The UI manager 302 is a module for controlling the scanner printers 102 and 112 via the scanner driver 303 and printer driver 304. The UI manager 302 controls the user interface and scanner printers 102 and 112 on the basis of user's operation input information, and information from the scanner driver 303 and printer driver 304. Reference numeral 308 denotes a device shared information module, which stores information of a document size selected at a document size select box 404 and information of a paper size (print sheet size) selected at a print sheet size select box 405, as will be described later with reference to FIG. 4. The device shared information module 308 stores information of scan and recording (print) setups in the form of a table (database) (FIG. 5; to be described later), and scan resolution information upon pre-scan. The information stored in the device shared information module 308 is shared among the UI manager 302, scanner driver 303, and printer driver 304. Note that the device shared information module 308 is a structure, and the locations of actual data of various kinds of setup information the device shared information module 308 stores are not particularly limited. That is, actual data may be stored in an HDD of the personal computer 101, or may be temporarily stored on the RAM of the personal computer 101.

Reference numeral 305 denotes a port driver which is a module provided by the OS, and controls the USB interface port 116 and parallel interface port 106. The port driver 305 includes a USB port driver 306 and parallel port driver 307, which respectively control the USB interface port 116 and parallel interface port 106 in accordance with an instruction from the UI manager 302 to exchange data.

Figure 4:
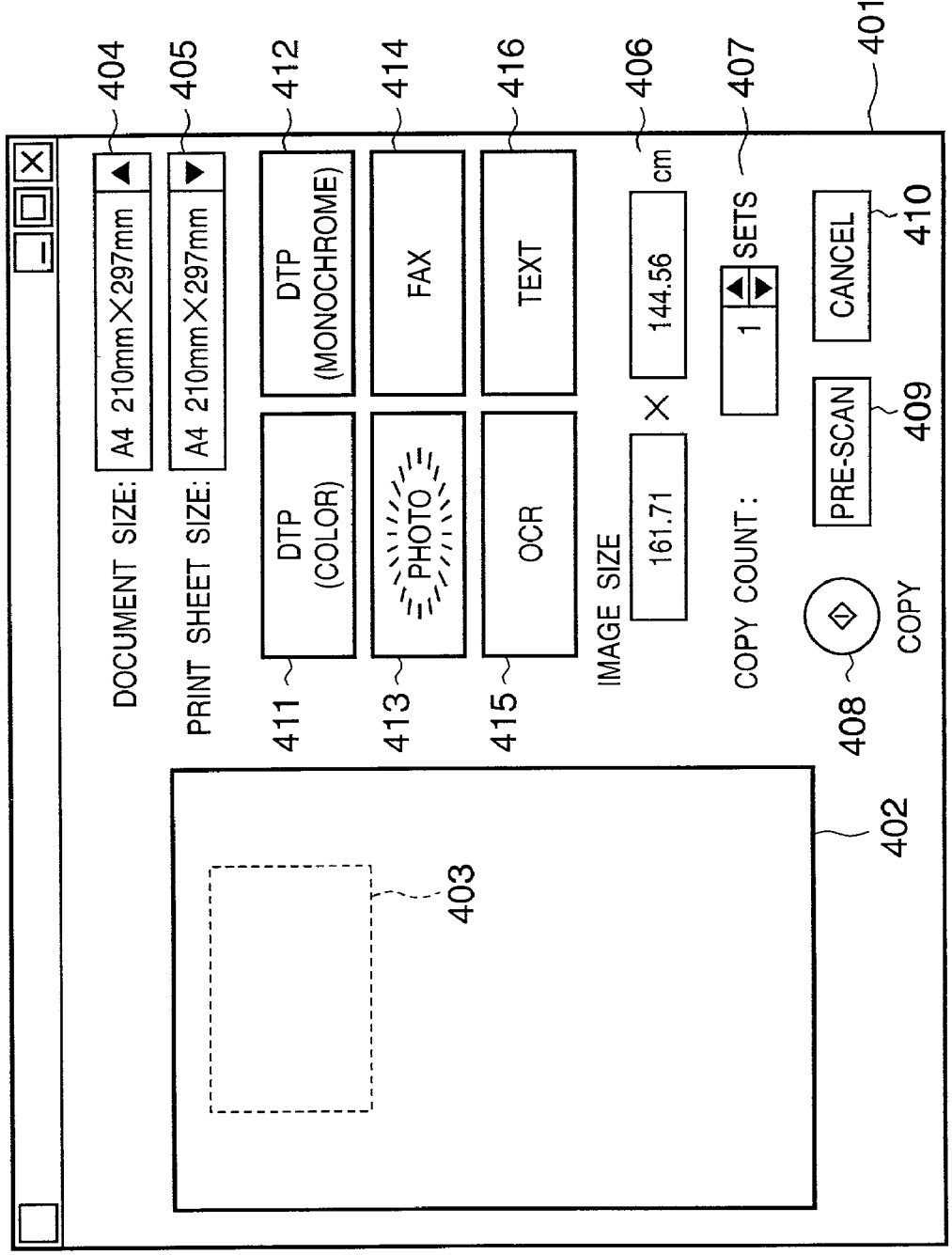
FIG. 4 shows an example of a main dialog box as a user interface.

FIG. 4 shows an example of a main dialog box as the user interface. Referring to FIG. 4, reference numeral 401 denotes a main dialog box, which determines setups in the scanner printers 102 and 112 in accordance with user's operations, and makes operations for starting/stopping copy operation and so forth. The main dialog box 401 is displayed on a display of the personal computer 101, and the user designates (clicks) various buttons of the main dialog box 401 displayed on the display using a pointing device such as a mouse or the like to attain various operation inputs. In this example, the main dialog box 401 has a preview area 402, a scan range 403, the document size select box 404, the print sheet size select box 405, a DTP (color) button 411, a DTP (monochrome) button 412, a photo button 413, a FAX button 414, an OCR button 415, a text button 416, an image size indication box 406, a copy count designation box 407, a copy button 408, a pre-scan button 409, and a cancel button 410.

The preview area 402 displays a pre-scan image or an image scanned in the copy mode. The scan range 403 is a range designation tool for arbitrarily setting an actual scan range within an allowable scan range. The document size select box 404 comprises a popup menu, and the document size to be scanned can be arbitrarily selected from postcard (100×148 mm), A5 (148×210 mm), A4 (210×297 mm), A3 (297×420 mm), B5 (182×257 mm), and B4 (257×364 mm). In the example shown in FIG. 4, A4 (210×297 mm) is selected.

The print sheet size select box 405 comprises a popup menu, and the paper size which is to be used in recording (print) can be arbitrarily selected from postcard (100×148 mm), A5 (148×210 mm), A4 (210×297 mm), A3 (297×420 mm), B5 (182×257 mm), and B4 (257×364 mm). In the example shown in FIG. 4, A4 (210×297 mm) is selected. The image size indication box 406 indicates the horizontal× vertical lengths (unit: centimeters) designated by the scan range 403. The copy count designation box 407 is comprised of a text field and spin buttons, and can arbitrarily designate the number of sets of copies (printouts) of a set of documents within the range from 1 to 99.

Note that the copy magnification is determined on the basis of the document size selected at the document size select box 404 and the paper size selected at the print sheet size select box 405. Upon copying a document, the copy application 301 zooms an image received from the scanner printer 112 on the basis of the determined copy magnification, and sends the zoomed image to the scanner printer 102. For example, when B5 is selected as the document size and A4 is selected as the paper size, the copy magnification is determined to be 115%. At this time, the copy application 301 executes a 115% enlarge process of the received image.

When one of the buttons 411 to 416 is clicked, that button is selected (highlighted). In this state, when the copy button 408 or pre-scan button 409 is clicked (pressed), the function of the selected button is enabled. In the example of FIG. 4, the photo button 413 is selected (highlighted). These buttons represent copy purposes (modes upon copying), and their meanings will be explained in detail later.

The cancel button 410 is used to cancel copy or pre-scan operation, and is enabled only during copy or pre-scan operation (gray out in other states). When the cancel button 410 is clicked (pressed) during copy or pre-scan operation, the copy or pre-scan operation is aborted, and the control returns to the standby state.

FIG. 5 shows scan and recording (print) setups of the buttons 411 to 416 that represent copy purposes. As shown in FIG. 5, scan and recording (print) setups are made in correspondence with the individual copy purposes. That is, scan setups including the scan method and scan resolution are made for the scanner printer 112 with the scanner cartridge 105 via the scanner driver 303, and recording (print) setups including the print method, print resolution, print medium, and print quality are made for the scanner printer 102 with the ink cartridge 104 via the printer driver 304. Note that the print quality is a setup that pertains to the print operation in the scanner printer 102, and includes, for example, the ink ejection amount from the ink cartridge 104, the number of passes (the number of times of scan on an identical region on the sheet surface), and the like.

For example, when the copy button 408 is clicked while the photo button 413 is selected, this means that copy operation in a photo mode is selected, scan setups including the scan method "color" and scan resolution "360×360 dpi" are made for the scanner printer 112, and recording (print) setups including the print method "color", print resolution "360×360 dpi", print medium "high-quality exclusive paper", and print quality "high quality" are made for the scanner printer 102.

On the other hand, when the pre-scan button 409 is clicked while the photo button 413 is selected, scan setups including the scan method "color" and scan resolution "90×90 dpi" are made for the scanner printer 112, but no recording (print) setups are made for the scanner printer 102. The reason why the scan resolution "90×90 dpi" is set in place of "360×360 dpi" shown in FIG. 5 in this case is that the scan resolution "90×90 dpi" is selected for all the copy purposes to set a high scan speed upon pre-scan. On the other hand, no setup is made for the scanner printer 102 since no print operation is made at the time of pre-scan, and there is no need to make setups that pertains to the print process. That is, in this embodiment, the value enabled upon clicking the pre-scan button 409 is only the scan method.

In this manner, the setups shown in FIG. 5 represent the setup values of the scan and recording (print) setups, which are preset in correspondence with the buttons 411 to 416. In other words, since the operator can set the scan and recording (print) setups at the same time by selecting any of the buttons 411 to 416, the operator can select a copy mode corresponding to the copy purpose of his or her choice. At this time, the setup values shown in FIG. 5 correspond to each copy mode. As shown in FIG. 5, these setup values are stored in the device shared information module 308 as information in the form of tables (databases) assigned to the individual buttons 411 to 416 (copy modes). Upon clicking (pressing) the copy button 408 or pre-scan button 409, the UI manager 302 acquires information which is stored in the device shared information module 308, and is assigned to the selected (highlighted) button (one of the buttons 411 to 416), information of the document size selected at the document size select box 404, information of the paper size (print sheet size) selected at the print sheet size select box 405, and the scan resolution information (90×90 dpi) upon pre-scan from the device shared information module 308, and sends the acquired information to the scanner driver 303 and printer driver 304. The scanner driver 303 and printer driver 304 control the scanner printers 102 and 112 in accordance with the information received from the UI manager 302.

Note that designation of a print medium shown in FIG. 5 amounts to executing an image process optimal to the designated medium, and is premised on that the user has set the designated medium.

On the other hand, the scan methods "color", "grayscale", and "monochrome" respectively indicate setups for scanning an image as R (red), G (green), and B (blue) multi-valued data, monochrome multi-valued data, and monochrome binary data, and print methods "color", "grayscale", and "monochrome" respectively indicate setups for printing a C (cyan), M (magenta), Y (yellow), and K (black) multi-valued image, a black multi-valued image, and a black binary image.

The processing of the copy application in this embodiment will be described below with reference to FIGS. 6 to 9.

Figure 6:
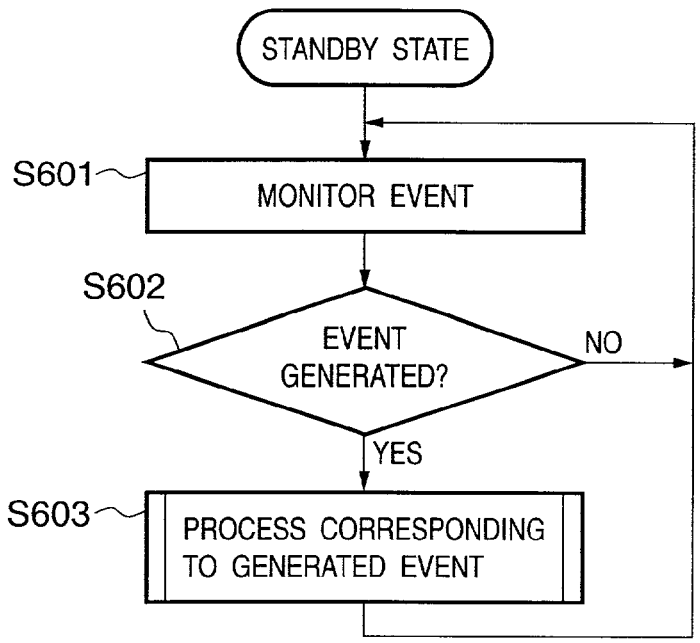
FIG. 6 is a flow chart showing the processing of the copy application 301 in a standby state.

FIG. 6 is a flow chart showing the processing of the copy application 301 in the standby state. In step S601, the UI manager 302 monitors generation of events in the standby state. If it is determined in step S602 that an event such as clicking (pressing) of the copy button 408 or the like is generated, the flow advances to step S603 to execute a process corresponding to the generated event, and the flow then returns to step S601 above.

Figure 7:
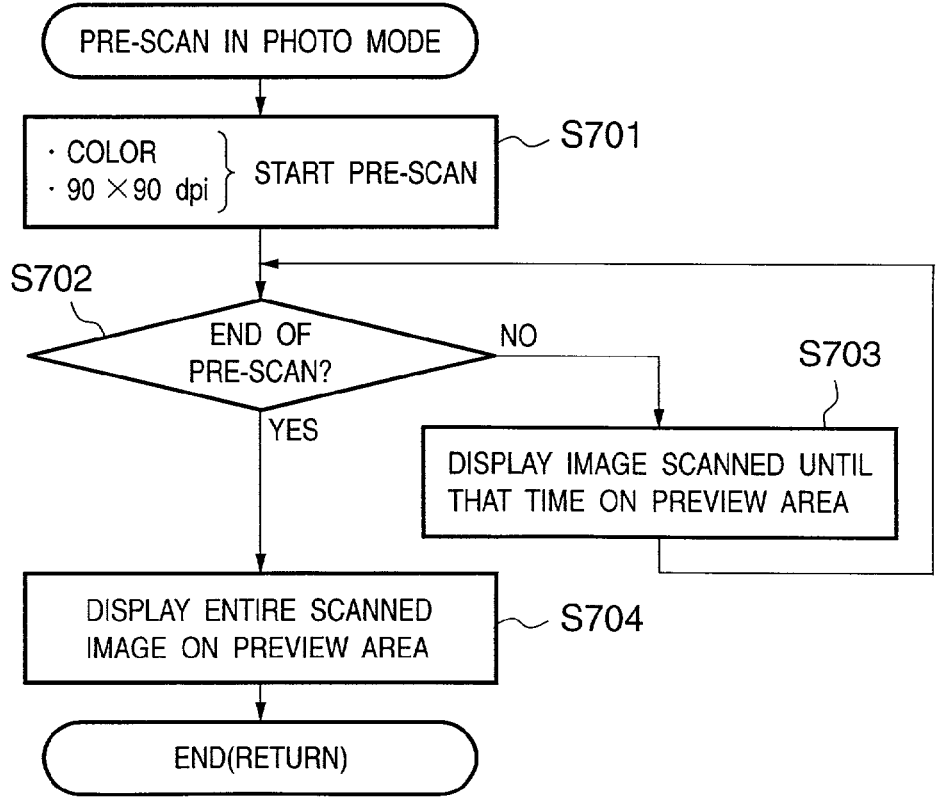
FIG. 7 is a flow chart showing an event process (prescan process) in step S603 shown in FIG. 6.

FIG. 7 is a flow chart showing the event process in step S603 shown in FIG. 6. FIG. 7 exemplifies a process when the pre-scan button 409 is clicked (pressed) while the photo button 413 is selected (highlighted) (pre-scan when the copy mode=photo mode). Also, assume that a color photo is prepared as a document.

Upon pre-scan in the photo mode, in step S701 a pre-scan starts by setting the scan method "color" and scan resolution "90×90 dpi" in the scanner printer 112 in accordance with the scan setup information and scan resolution information upon pre-scan, which are stored in the device shared information module 308. It is checked in step S702 if the pre-scan has ended. If NO in step S702, the flow advances to step S703, and an image scanned until that time is gradually displayed on the preview area 402. After that, when the pre-scan ends, the flow advances to step S704 to display the entire scanned image on the preview area 402, thus ending this event process.

Figure 8:
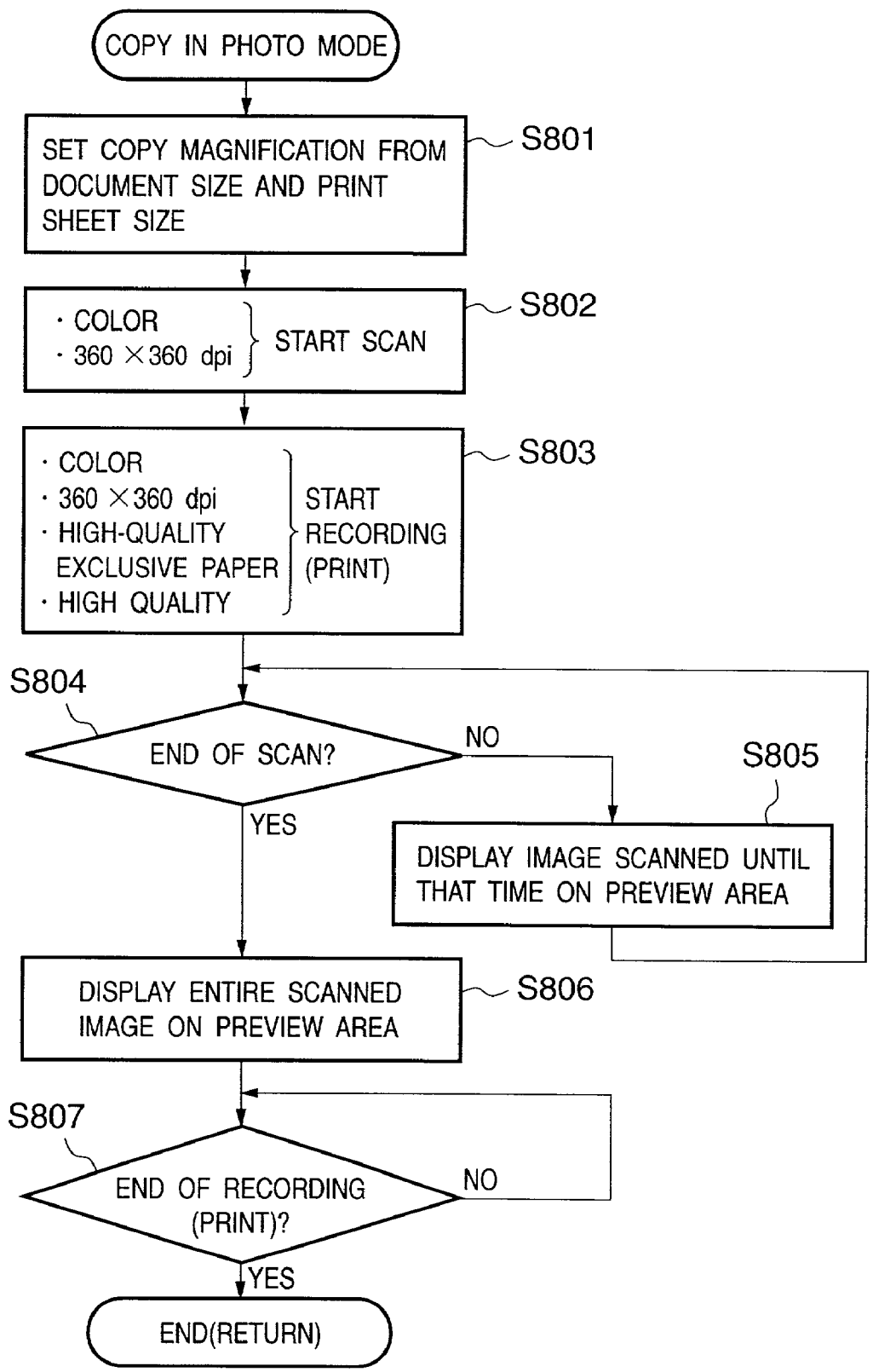
FIG. 8 is a flow chart showing an event process (copy process) in step S603 shown in FIG. 6.

FIG. 8 is a flow chart showing the event process in step S603 shown in FIG. 6. FIG. 8 exemplifies a process when the copy button 408 is clicked (pressed) while the photo button 413 is selected (highlighted) (copying when the copy mode=photo mode). Also, assume that a color photo is prepared as a document.

Upon copying in the photo mode, in step S801 a copy magnification is set based on the document size and print sheet size which are set at the document size select box 404 and print sheet size select box 405, and are stored in the device shared information module 308. More specifically, in the example shown in FIG. 4, since both the document size and print sheet size are A4 (210×297 mm), a magnification=100% is set. In step S802, the UI manager 302 acquires scan setup information stored in the device shared information module 308, and upon receiving the acquired scan setup information, the scanner driver 303 sets the scan method "color" and scan resolution "360×360 dpi" shown in FIG. 5 in the scanner printer 112 in accordance with the received information, thus starting a copy scan process. In step S803, the UI manager 302 acquires recording (print) setup information stored in the device shared information module 308, and upon receiving the acquired recording (print) setup information, the printer driver 304 sets the print method "color", print resolution "360×360 dpi", print medium "high-quality exclusive paper", and print quality "high quality" in the scanner printer 102 shown in FIG. 5 in accordance with the received information, thus starting a copy recording (print) process.

It is checked in step S804 if the copy scan process is complete. If NO in step S804, the flow advances to step S805 to gradually display an image scanned until that time on the preview area 402. After that, upon completion of the copy scan process, the flow advances to step S806 to display the entire scanned image on the preview area 402. It is then checked in step S807 if the copy recording (print) process corresponding to the number of sets designated at the copy count designation box 407 is complete. If NO in step S807, the copy recording (print) process is repeated; otherwise, this event process ends.

Note that the processing shown in FIG. 8 is executed when the copy button 408 is clicked (pressed) while the photo button 413 is selected (highlighted) (copying when the copy mode=photo mode). But the scanner printer 112 alone may be connected to the personal computer 101, and no scanner printer 102 may be available in some cases. The processing in such case will be explained below.

Figure 9:
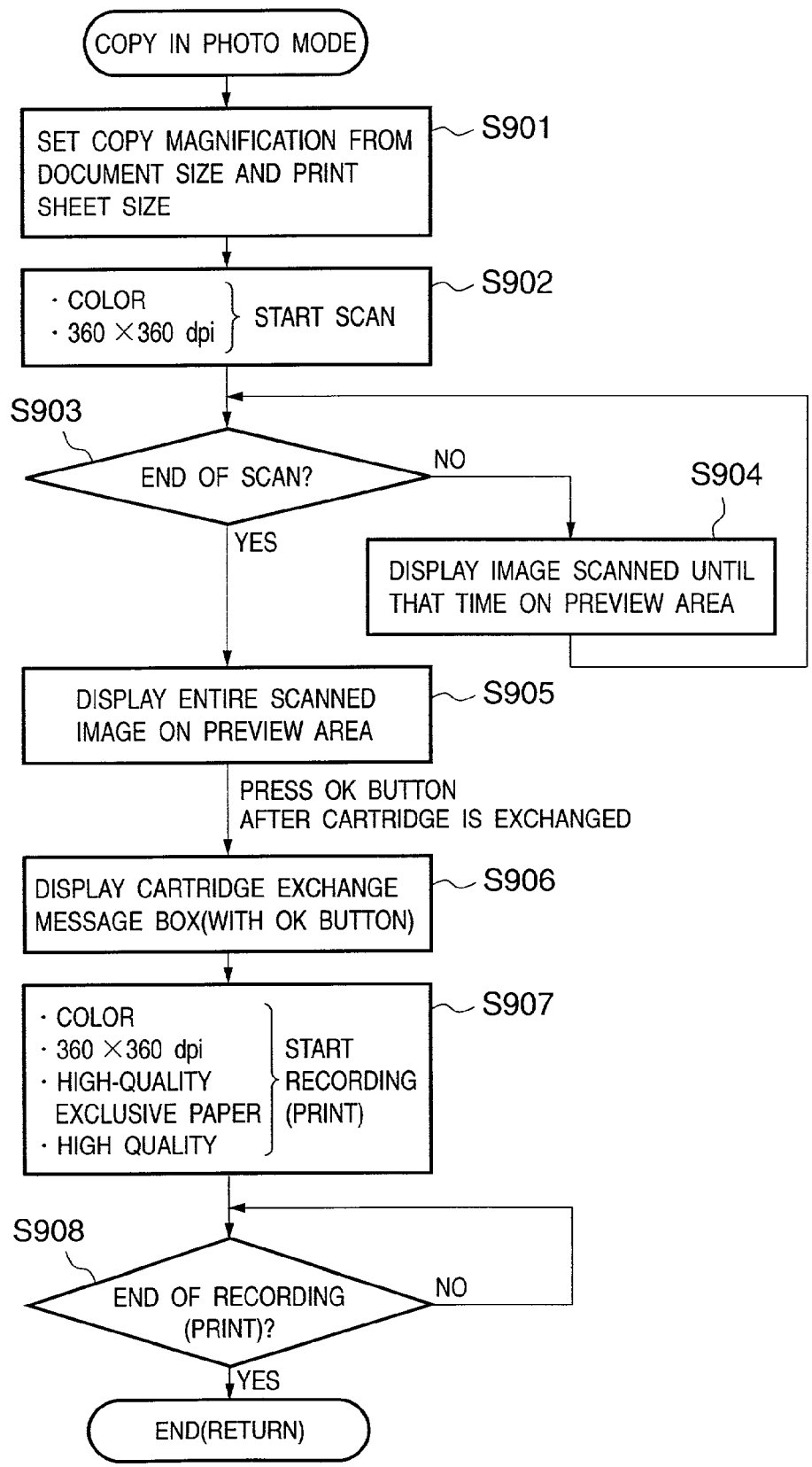
FIG. 9 is a flow chart showing the process when a scanner printer 112 alone is connected to a personal computer 101, and a copy button 408 is clicked (pressed) while a photo button 413 is selected (highlighted) (copy in a photo mode)
Figure 10:
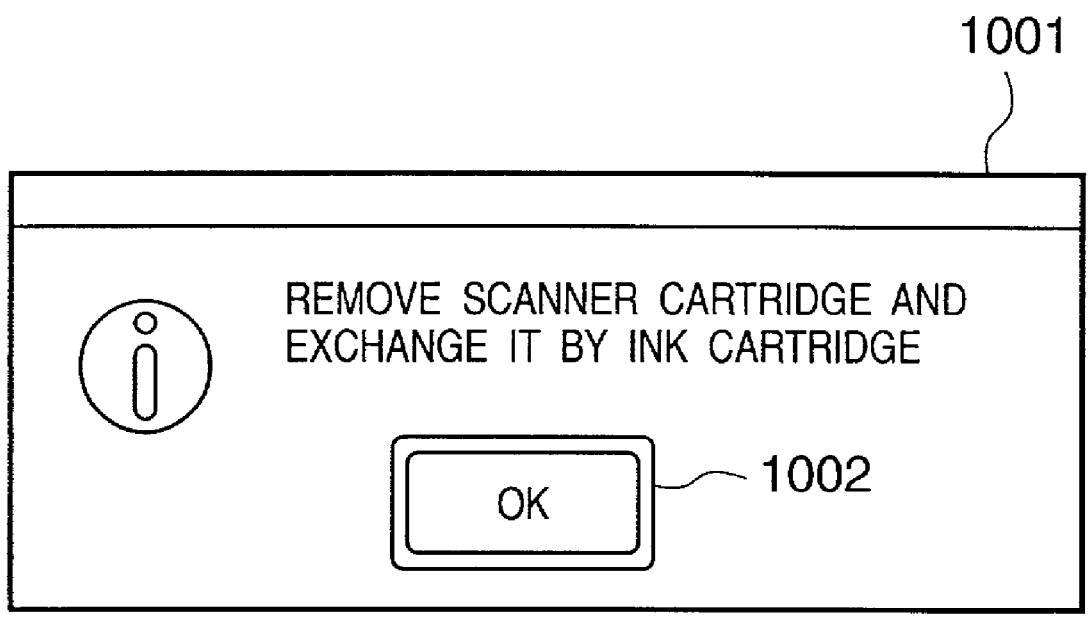
FIG. 10 shows a cartridge exchange message box 1001.

FIG. 9 is a flow chart showing the processing when the scanner printer 112 alone is connected to the personal computer 101, and the copy button 408 is clicked (pressed) while the photo button 423 is selected (highlighted) (copying when the copy mode=photo mode).

Upon copying in the photo mode, in step S901 a copy magnification is set based on the document size and print sheet size which are set at the document size select box 404 and print sheet size select box 405, and are stored in the device shared information module 308. More specifically, in the example shown in FIG. 4, since both the document size and print sheet size are A4 (210×297 mm), a magnification=100% is set. In step S902, the UI manager 302 acquires scan setup information stored in the device shared information module 308, and upon receiving the acquired scan setup information, the scanner driver 303 sets the scan method "color" and scan resolution "360×360 dpi" shown in FIG. 5 in the scanner printer 112 in accordance with the received information, thus starting a copy scan process.

It is checked in step S903 if the copy scan process is complete. If NO in step S903, the flow advances to step S904 to gradually display an image scanned until that time on the preview area 402. After that, upon completion of the copy scan process, the flow advances to step S905 to display the entire scanned image on the preview area 402. A cartridge exchange message box 1001 shown in, e.g., FIG.

10 is displayed in step S906, and the control waits until the scanner cartridge 105 on the carriage 103 is exchanged by the ink cartridge 104, and the user clicks (presses) an "OK" button 1002.

If the "OK" button 1002 is clicked (pressed), the flow advances to step S907. In step S907, the UI manager 302 acquires recording (print) setup information stored in the device shared information module 308, and upon receiving the acquired recording (print) setup information, the printer driver 304 sets the print method "color", print resolution "360×360 dpi", print medium "high-quality exclusive paper", and print quality "high quality" in the scanner printer 102 shown in FIG. 5 in accordance with the received information, thus starting a copy recording (print) process. After that, the copy recording (print) process is repeated in correspondence with the number of sets designated at the copy count designation box 407 in step S908. Upon completion of the copy recording (print process), this event process ends.

According to this embodiment, scan and recording (print) setup values are present in the buttons 411 to 416 in correspondence with copy purposes, and a desired copy mode can be selected using the copy purpose buttons 411 to 416. When the copy button 408 is clicked (pressed) while one of the copy purpose buttons 411 to 416 is selected, a document image is scanned in accordance with scan setups corresponding to the selected copy mode, and the scanned image is recorded in accordance with the corresponding recording (print) setups. Therefore, a copy process corresponding to the type of document can be achieved with high quality by simple operations.

In this manner, when the document is a normal text document, a high-speed, standard-quality copy process is done; when the document is a color photo, a high-resolution, high-quality copy process is done. Hence, a copy process corresponding to its purpose can be reliably done by simple operations without wasting time.

Since a pre-scan can be made, only an image portion within the range selected by the scan range 403 can be copied on the basis of a pre-scan image displayed on the preview area 402. Hence, only a required portion can be copied by simple operations without wasting time. Furthermore, a quick pre-scan can be done since a relatively low scan resolution ("90×90 dpi" in this embodiment) of the scan resolution performance of the device is set irrespective of the preset scan resolution.

This embodiment uses Microsoft Windows 95 or 98 as the OS. However, the present invention is not limited to such specific OS, and can be implemented using an arbitrary OS by adopting the same arrangement.

This embodiment uses a parallel interface which complies with IEEE P1284 as the standard of Standard Signaling Method for a Bi-directional Parallel Peripheral Interface for Personal Computers, as the interface between, e.g., the personal computer 101 and scanner printer 102. However, the present invention is not limited to such specific interface, and can be implemented using an arbitrary interface by adopting the same arrangement.

Also, this embodiment uses a USB (Universal Serial Bus) interface as the interface between, e.g., the personal computer 101 and scanner printer 112. However, the present invention is not limited to such specific interface, and can be implemented using an arbitrary interface by adopting the same arrangement.

This embodiment uses the scanner printer 112 as an example of a scanner. However, the present invention is not limited to such specific device, and can be implemented using a normal arbitrary scanner if it does not have any printer function.

Likewise, this embodiment uses the scanner printer 102 as an example of a printer. However, the present invention is not limited to such specific device, and can be implemented using a normal arbitrary printer if it does not have any scanner function.

Also, the present invention can use an image processing apparatus such as a digital copying machine or the like, which integrates scanner and printer units. That is, the present invention can be applied to a copy system that uses the scanner function alone of the digital copying machine, and uses an arbitrary independent printer. Likewise, the present invention can be applied to a copy system that uses an arbitrary scanner, and the printer function of the digital copying machine as a printer.

As described above, according to this embodiment, the copy application that controls a copy function of copying a document prepared on a scanner, and printing the copied image using a printer prepares a plurality of copy purpose select buttons and a copy start button as the user interface. Scan setup values to be set in the scanner, and print setup values to be set in the printer are assigned to the copy purpose select buttons. When the copy start button is pressed while one of the copy purpose select buttons is selected, the scan setup values assigned to the selected button are set in the scanner to scan a document image on the basis of these setup values, and the print setup values assigned to the selected button are set in the printer to print the scanned image on the basis of these setup values.

In this manner, a copy process corresponding to the type of document can be achieved with high quality by simple operations. For example, when the document is a normal text document, a high-speed, standard-quality copy process is done; when the document is a color photo, a high-resolution, high-quality copy process is done. Hence, a copy process corresponding to its purpose can be reliably done by simple operations without wasting time.

In this embodiment, a pre-scan button, a preview area for displaying the scanned image, and a scan range designation means for designating a scan range are prepared as the user interface of the application.

In this manner, since a pre-scan can be made, only an image portion within the range selected by the scan range can be copied on the basis of a pre-scan image displayed on the preview area. Hence, only a required portion can be copied by simple operations without wasting time.

In this embodiment, a quick pre-scan can be done since a relatively low scan resolution of the scan resolution performance of the device is set irrespective of the preset scan resolution.

This embodiment uses a scanner printer which comprises a detachable scanner cartridge and ink cartridge, and a copy system can be built even when only one printer (scanner printer) is connected to a host computer. Hence, all the aforementioned effects can be obtained by the same arrangement. In this case, since a scanner and printer need not be independently present, the required space can be reduced, and a copy system can be easily implemented wherever the user wants.

(Second Embodiment)

The first embodiment described above uses the scanner printer 112 as an example of a scanner. However, the present invention is not limited to such specific device, and can be implemented using a normal arbitrary scanner if it does not have any printer function.

Likewise, the first embodiment uses the scanner printer 102 as an example of a printer. However, the present invention is not limited to such specific device, and can be implemented using a normal arbitrary printer if it does not have any scanner function.

This embodiment will exemplify a copy system that uses an arbitrary scanner and printer.

Figure 11:
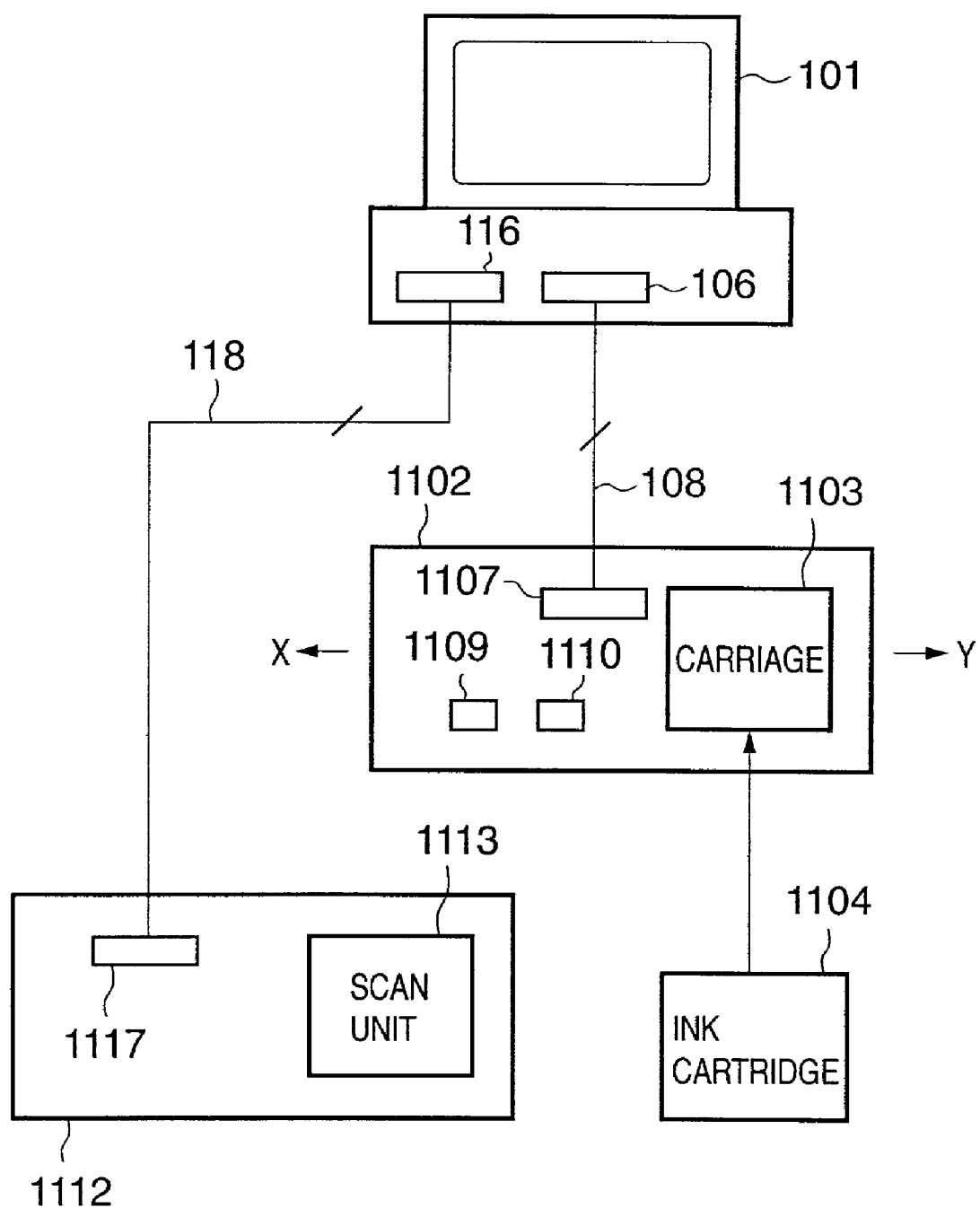
FIG. 11 is a block diagram showing the arrangement of a copy system according to the second embodiment of the present invention.

FIG. 11 is a block diagram showing the arrangement of a copy system of this embodiment. Referring to FIG. 11, reference numeral 101 denotes a personal computer, which is the same as that described in the first embodiment. Reference numeral 1102 denotes a printer which is an ink-jet printer to which a head-integrated ink cartridge can be detachably attached. Reference numerals 106 and 1107 denote bi-directional parallel interface ports, which allow bi-directional parallel communications between the personal computer 101 and printer 1102 via a parallel interface cable 108.

Reference numeral 1109 denotes a cartridge exchange button, which is pressed upon exchanging an ink cartridge 1104. Upon depression of this button, a carriage 1103 moves to a cartridge exchange position (not shown), and the user can freely exchange the cartridge in this state. Reference numeral 1110 denotes a detection sensor which detects a print sheet. More specifically, the sensor 110 detects the presence/absence of a print sheet when the ink cartridge 1104 is mounted on the carriage 1103. Note that the carriage 1103 moves in the X-Y direction in FIG. 11 to make a print operation.

Reference numeral 1112 denotes a scanner which uses a USB (Universal Serial Bus) interface unlike in the printer 1102. Reference numerals 116 and 1117 denote USB interface ports, which allow bi-directional communications between the personal computer 101 and scanner 1112 via a USB interface cable 118. Reference numeral 1113 denotes a scan unit which includes a document table on which a document to be scanned is set, a CCD sensor for scanning a document image, and the like.

The internal arrangement of the printer 1102 can be explained as that obtained by excluding the scanner function from the building blocks of the scanner printer shown in FIG. 2. Also, the internal arrangement of the scanner 1112 can be explained as that obtained by excluding the printer function from the building blocks of the scanner printer shown in FIG. 2.

In this embodiment, a scanner driver 303 can control the scanner 1112, and a printer driver 304 can control the printer 1102 as in the first embodiment. Assume that the personal computer 101 pre-stores the scanner driver 303 and printer driver 304.

When a document image is to be scanned using the scanner 1112 alone, the scanner driver 303 is launched to control an image scan by the scanner 1112.

The scanner driver 303 can display a dialog box (not shown) used to control a document scan operation on a display. The operator can select a scan mode from the dialog box. The scanner driver 303 can operate based on six scan modes shown in a table 1201 in FIG. 12. Alternatively, scan purpose buttons may be displayed on the dialog box in correspondence with the scan modes, and the operator may select a desired button, as in the first embodiment.

For example, when the operator selects a scan mode "DTP (color)" and issues a scan start instruction, the scanner driver 303 looks up the table 1201 in response to this instruction.

The scanner driver 303 then controls the scanner 1112 via the USB interface cable 118 in accordance with the scan method "color" and scan resolution (dpi) "180×180" as the corresponding scan setups. The scanner 1112 scans a document image based on the aforementioned scan setups and sends the scanned image to the personal computer 101.

When an image is to be printed using the printer 1102 alone, the printer driver 304 is launched to control an image print process by the printer 1102.

The printer driver 304 can display a dialog box (not shown) used to control an image print operation on the display. The operator can select a print mode from the dialog box. The printer driver 304 can operate based on six print modes shown in a table 1202 in FIG. 12. Alternatively, print purpose buttons may be displayed on the dialog box in correspondence with the print modes, and the operator may select a desired button, as in the first embodiment.

For example, when the operator selects a print mode "DTP (color)" and issues a print start instruction, the printer driver 304 looks up the table 1202 in response to this instruction. The printer driver 304 then controls the printer 1102 via the parallel interface cable 108 in accordance with the print method "color" and print resolution (dpi) "180×180" as the corresponding print setups. The printer 1102 prints an image input from the personal computer 101 on the basis of the aforementioned print setups.

The copy system of this embodiment will be described in detail below. The copy system of this embodiment can be implemented by using a copy application on the personal computer 101. The block diagram of this copy application is the same as that shown in FIG. 3. Hence, a description of the copy application will be given using the block diagram in FIG. 3.

Modules such as a UI manager 302, device shared information module 308, and the like of this embodiment have the same functions as those described in the first embodiment. In this embodiment, the UI manager 302 further has a table generation function that can implement a copy system using an arbitrary scanner and printer. The table generation function will be described below.

In the copy system of this embodiment, the scanner 1112 and printer 1102 can be used as stand-alone devices, and the scanner driver 303 and printer driver 304 respectively have the tables 1201 and 1202.

When a copy operation is done using the scanner 1112 and printer 1102, one scan mode and one print mode are respectively selected from these tables, and a copy start instruction can then be issued.

Figure 12:
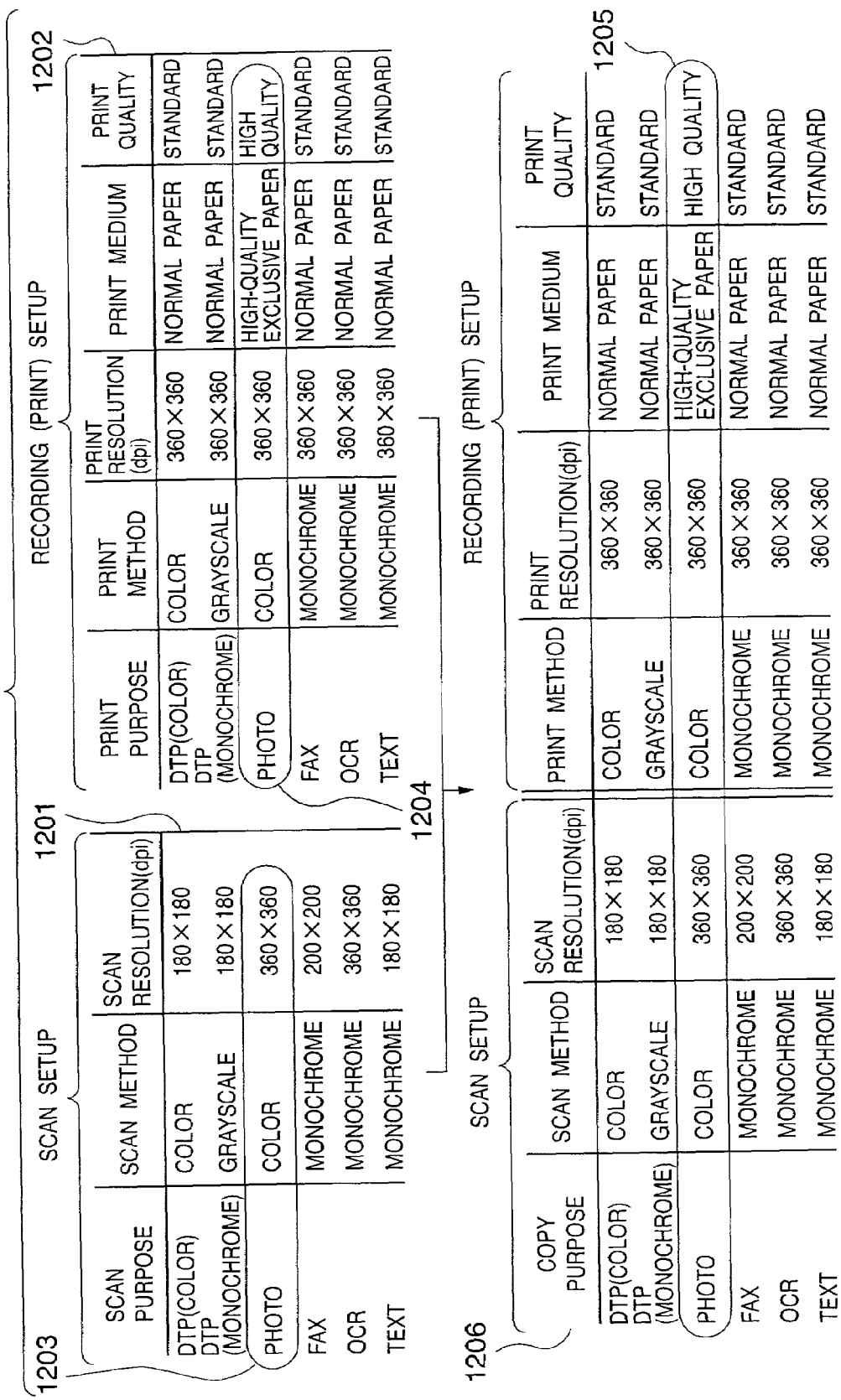
FIG. 12 is a view for explaining scan, print, and copy purpose modes, and tables of those modes in the second embodiment.

As shown in FIG. 12, the table 1201 has six scan modes, and the table 1202 has six print modes. Therefore, a total of 36 different copy setups can be achieved by combining a plurality of scan modes and a plurality of print modes. However, an operation for selecting an appropriate combination of copy setups from these setups is often troublesome, and an unwanted copy is often formed due to select errors.

To achieve an appropriate copy process by simple operations, the personal computer 101 can comprise a table that implements the copy modes described in the first embodiment. However, in a system that connects an arbitrary scanner and printer as in this embodiment, the personal computer 101 does not always hold such table beforehand.

This embodiment has as its object to attain an appropriate copy process by simple operations even in a system that connects an arbitrary scanner and printer. To achieve this object, a copy application 301 of this embodiment has a function of generating a plurality of copy modes from these plurality of scan and print modes.

A copy mode generation process by the copy application 301 upon executing a copy operation using the copy system will be described in detail below.

When the operator launches the copy application 301, the UI manager 302 acquires the scan mode table 1201 and print mode table 1202 from the scan driver 303 and printer driver 304.

The UI manager 302 generates copy modes from the acquired tables. Note that a generation method includes a method of comparing the names (identification information) of the respective scan modes with those of the print modes, and selecting the best combination of appropriate scan and print modes to generate a copy mode.

For example, the name (identification information) of a scan mode "photo" in the table 1201 matches that of a print mode "photo" in the table 1202. Therefore, a photo mode name (identification information) "photo" suitable for copying a photo, and corresponding copy setup information (scan setup information and print setup information) 1205 can be generated using the scan mode name (identification information) "photo" and corresponding setup information 1203, and the print mode name (identification information) "photo" and corresponding setup information 1204.

In FIG. 12, reference numeral 1206 denotes a table that stores a plurality of copy modes generated from the tables 1201 and 1202, and corresponding scan setup information and print setup information. The table 1206 is generated by the UI manager 302, and is temporarily stored in the device shared information module 308.

The UI manager 302 assigns the copy modes in the stored table 1203 to copy purpose buttons 411 to 416 on a main dialog box 401 to allow the operator to select a desired mode.

With the aforementioned process, the generation process of copy modes (table 1206) is completed. The copy operation using these copy mode can be made as in the first embodiment.

The generated table 1206 may be stored in a hard disk (not shown) of the personal computer 101 after the copy application 301 quits.

The table generation method is not limited to the aforementioned specific method since the scanner driver and printer driver may not have the aforementioned scan and print modes. Hence, the table may be generated by other methods.

This embodiment has explained the table generation function of a copy application in a copy system that connects an arbitrary scanner and printer. However, the present invention is not limited to such system, and the table generation function of the copy application can be applied to a copy system using scanner printers as in the first embodiment.

As described above, according to this embodiment, in a copy system that connects an arbitrary scanner and printer, the copy application comprises a table generation function for a copy operation.

With this function, even when the copy application does not have any copy modes and their setup information, copy modes can be generated in accordance with the system configuration, and a copy operation can be made based on the generated copy mode.

Since the generated copy modes are assigned to the copy purpose buttons on the main dialog box, an appropriate copy image can be obtained by simple operations.

The present invention has been explained using the first and second embodiments, but the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention has been explained by way of its preferred embodiments, but the present invention is not limited to the aforementioned embodiments and various changes may be made within the scope of the appended claims.

What is claimed is:

1. An information processing apparatus which is connected to an image input device and image output device, comprising:

an input control unit adapted to control an image input process by the image input device;

an output control unit adapted to control an image output process by the image output device;

a storage unit adapted to store information of any one of a plurality of input setups and any on of a plurality of output setups, wherein the information corresponds to each of a plurality of image processing modes; and an acquisition unit adapted to acquire the information of an input setup and an output setup corresponding to the image processing mode selected by an operator from said storage unit, wherein said input control unit controls the image input process of the image input device on the basis of the information of the input setup acquired by said acquisition unit, and said output control unit controls the image output process of the image output device on the basis of the information of the output setup acquired by said acquisition unit.

2. The apparatus according to claim 1, further comprising a display unit adapted to display the plurality of image processing modes.

3. The apparatus according to claim 1, wherein the image input device is an image scanner for scanning a document image, and said input control unit is an image scan controller for controlling an image scan process by the image scanner.

4. The apparatus according to claim 3, wherein the image output device is a printer for printing an image, and said output control unit is a print controller for controlling an image print process by the printer.

5. The apparatus according to claim 4, wherein the plurality of image processing modes are a plurality of copy modes which pertain to copy operation that uses the image scanner and the printer, and the information of the input setup and output setup is information of a scan setup and print setup corresponding to each of the plurality of copy modes.

6. The apparatus according to claim 5, wherein the information of the scan setup includes information which pertains to a scan method and scan resolution.

7. The apparatus according to claim 5, wherein the information of the print setup includes information which pertains to a print method, print resolution, print medium type, and print quality.

8. The apparatus according to claim 7, wherein said scan control unit controls the image scanner to scan an image at a resolution lower than the scan resolution contained in the scan setup.

9. The apparatus according to claim 4, wherein the printer is a printer with an image scan function, which is integrated with the image scanner, and the image scanner is detachable from the printer with the image scan function.

10. The apparatus according to claim 2, further comprising a generation unit adapted to generate a plurality of image processing modes from the information of the plurality of input setups for controlling the image input device and the information of the plurality of output setups for controlling the image output device,
wherein said storage unit stores the information of an input setup and output setup in correspondence with each of the plurality of generated image processing modes, and said display unit displays each of the plurality of image processing modes stored in said storage unit.

11. The apparatus according to claim 4, wherein said storage unit stores scan medium size information and print medium size information, which are selected by an operator, and
said apparatus further comprises:
determination unit adapted to determine a copy magnification on the basis of the scan medium size information and print medium size information stored in said storage unit; and
zoom processing unit adapted to zoom an image scanned by the image scanner on the basis of the copy magnification determined by said determination unit.

12. An information processing apparatus which is connected to an image input device and image output device, comprising:
generation unit adapted to generate a plurality of image processing modes from information of a plurality of input setups for controlling the image input device, and information of a plurality of output setups for controlling the image output device;
storage unit adapted to store the information of any one of the plurality of input setups and the information of any one of the plurality of output setups, wherein the information corresponds to each of the plurality of image processing modes; and
display unit adapted to display each of the plurality of image processing modes stored in said storage unit such that an operator can select any one of the plurality of the image processing modes.

13. The apparatus according to claim 12, further comprising:
input control unit adapted to control the image input device on the basis of the information of an input setup; and
output control unit adapted to control the image output device on the basis of the information of an output setup.

14. The apparatus according to claim 13, wherein the image input device is an image scanner for scanning a document image, and said input control unit is an image scan controller for controlling an image scan process by the image scanner.

15. The apparatus according to claim 14, wherein the image output device is a printer for printing an image, and said output control unit is a print controller for controlling an image print process by the printer.

16. The apparatus according to claim 15, wherein said generation unit generates the plurality of copy modes on the basis of information of scan setup for controlling the image scanner and information of print setup for controlling the printer, and said storage unit stores the information of scan setup and print setup in correspondence with each of the plurality of copy modes.

17. The apparatus according to claim 16, wherein the information of scan setup includes information which pertains to a scan method and scan resolution.

18. The apparatus according to claim 16, wherein the information of print setup includes information which pertains to a print method, print resolution, print medium type, and print quality.

19. An image processing method in an information processing apparatus which is connected to an image input device and image output device, comprising:
acquiring information of an input setup and output setup corresponding to an image processing mode selected by an operator from a memory, which stores information of any one of a plurality of input setups and any one of a plurality of output setups, wherein the information corresponds to each of a plurality of image processing modes;
controlling an image input process of the image input device on the basis of the acquired information of the input setup; and
controlling an image output process of the image output device on the basis of the acquired information of the output setup.

20. The method according to claim 19, further comprising displaying the plurality of image processing modes on a display.

21. The method according to claim 19, wherein the image input device is an image scanner for scanning a document image, and an image scan controller controls an image scan process by the image scanner.

22. The method according to claim 21, wherein the image output device is a printer for printing an image, and a print controller controls an image print process by the printer.

23. The method according to claim 22, wherein the plurality of image processing modes are a plurality of copy modes which pertain to copy operation using the image scanner and the printer, and the information of the input setup and output setup is information of a scan setup and print setup corresponding to each of the plurality of copy modes.

24. The method according to claim 23, wherein the information of the scan setup includes information which pertains to a scan method and scan resolution.

25. The method according to claim 23, wherein the information of the print setup includes information which pertains to a print method, print resolution, print medium type, and print quality.

26. The method according to claim 25, wherein the image scanner is controlled to scan an image at a resolution lower than the scan resolution contained in the scan setup.

27. The method according to claim 20, further comprising:
generating a plurality of image processing modes from the information of the plurality of input setups for controlling the image input device and the information of the plurality of output setups for controlling the image output device; and
storing in the memory the information of an input setup and output setup information in correspondence with each of the plurality of generated image processing modes,
wherein each of the plurality of image processing modes is displayed on the display.

28. The method according to claim 22, wherein scan medium size information and print medium size information, which are selected by an operator, are pre stored in the memory, and
said method further comprises:
determining a copy magnification on the basis of the stored scan medium size information and print medium size information; and
zooming an image scanned by the image scanner on the basis of the determined copy magnification.

29. An image processing method in an information processing apparatus which is connected to an image input device and image output device, comprising:
generating a plurality of image processing modes from information of a plurality of input setups for controlling the image input device, and information of a plurality of output setups for controlling the image output device;
storing in a memory the information of any one of the plurality of input setups and the information of any one of the plurality of output setups, wherein the information corresponds to each of the plurality of image processing modes; and
controlling to display on a display each of the plurality of image processing modes such that an operator can select any one of the plurality of the image processing modes.

30. The method according to claim 29, further comprising:
controlling the image input device on the basis of the information of an input setup; and
controlling the image output device on the basis of the information of an output setup information.

31. The method according to claim 30, wherein the image input device is an image scanner for scanning a document image, and an image scan controller controls an image scan process by the image scanner.

32. The method according to claim 31, wherein the image output device is a printer for printing an image, and a print controller controls an image print process by the printer.

33. The method according to claim 32, wherein the plurality of copy modes is generated on the basis of information of scan setup for controlling the image scanner and information of print setup for controlling the printer, and the information of scan setup and print setup is stored in the memory in correspondence with each of the plurality of copy modes.

34. The method according to claim 33, wherein the information of scan setup includes information which pertains to a scan method and scan resolution.

35. The method according to claim 33, wherein the information of print setup includes information which pertains to a print method, print resolution, print medium type, and print quality.

36. A computer readable storage medium which stores a program code of an image processing method in an information processing apparatus which is connected to an image input device and image output device, comprising:
an acquisition code for acquiring information of an input setup and output setup corresponding to an image processing mode selected by an operator from a memory, which stores information of any one of a plurality of input setups and any one of a plurality of output setups, wherein the information corresponds to each of a plurality of image processing modes;
an input control code for controlling an image input process of the image input device on the basis of the information of the input setup information acquired by the acquisition code; and
an output control code for controlling an image output process of the image output device on the basis of the information of the output setup acquired by the acquisition code.

37. A computer readable storage medium which stores a program code of an image processing method in an information processing apparatus which is connected to an image input device and image output device, comprising:
a generation code for generating a plurality of image processing modes from information of a plurality of input setups for controlling the image input device, and information of a plurality of output setups for controlling the image output device;
a storage code for storing in a memory the information of any one of the plurality of input setups and the information of any one of the plurality of output setups, wherein the information corresponds to each of the plurality of image processing modes; and
a display control code for controlling to display on a display each of the plurality of image processing modes stored by the storage code such that an operator can select any one of the plurality of the image processing modes.

38. A computer readable memory which stores a program code of an image processing method which is implemented using a scanner driver and printer driver in a host computer which is connected to a scanner and a printer, comprising:
a copy control code for controlling the scanner driver for controlling a scanning process of the scanner and printer driver for controlling a printing process of the printer, and controlling a user interface which is used for a copy operation and displaying copy information; and
a shared information storing code for storing, in a memory, information which is shared and used among the scanner driver, the printer driver, and the copy control code,
wherein the shared information storing code stores information of a plurality of scan setups and a plurality of print setups as copy modes, and
wherein the copy control code acquires information of a scan setup and print setup corresponding to a copy mode selected by an operator from the memory, the information of scan setup is passed to the scanner driver and the information of print setup is passed to the printer driver.

39. The medium according to claim 38, wherein the copy control code controls to display the plurality of copy modes on the user interface.

40. The medium according to claim 39, wherein the setup information includes scan document size information and print paper size information.

41. The medium according to claim 40, wherein the copy control code controls to acquire the scan document size information and print paper size information selected by the operator from the memory, determine a copy magnification on the basis of the acquired scan document size information and print paper size information, and zoom an image scanned by the scanner on the basis of the determined copy magnifications.

42. The medium according to claim 38, wherein the copy control code controls to generate a plurality of copy modes from the setup information, and display the plurality of generated copy modes on the user interface in correspondence with the setup information.

43. The medium according to claim 42, wherein the copy control code generates the plurality of copy modes from information of a scan setup and print setup included in the information.

44. A program stored on a computer readable medium for implementing an image processing method in an information processing apparatus which is connected to an image input device and image output device, comprising:
  acquiring information of an input setup and output setup corresponding to an image processing mode selected by an operator from a memory, which stores information of any one of a plurality of input setups and any one of a plurality of output setups, wherein the information corresponds to each of a plurality of image processing modes;
  controlling an image input process of the image input device on the basis of the acquired information of the input setup; and
  controlling an image output process of the image output device on the basis of the acquired information of the output setup.

45. A program stored on a computer readable medium for implementing an image processing method in an information processing apparatus which is connected to an image input device and image output device, comprising:
  generating a plurality of image processing modes from information of a plurality of input setups for controlling the image output device, and information of a plurality of output setups for controlling the image output device;
  storing in a memory the information of any one of the plurality of input setups and the information of any one of the plurality of output setups, wherein the information corresponds to each of the plurality of image processing modes; and
  controlling to display on a display each of the plurality of image processing modes such that an operator can select any one of the plurality of the image processing modes.

46. A program stored on a computer readable medium code for implementing an image processing method that uses a scanner driver and printer driver in a host computer which is connected to a scanner and printer, comprising:
  controlling the scanner driver for controlling a scanning process of the scanner and printer driver for controlling a printing process of the printer, and controlling a user interface which is used for a copy operation and displaying copy information; and
  storing, in a memory, information which is shared and used among the scanner driver, the printer driver, and the controlling,
  wherein information of a plurality of scan setups and a plurality of print setups is stored as copy modes, and
  wherein information of a scan setup and print setup corresponding to a copy mode selected by an operator is acquired from the memory, the information of scan setup is passed to the scanner driver and the information of print setup is passed to the printer driver.

47. The program according to claim 46, wherein the plurality of copy modes is displayed on the user interface.

48. The program according to claim 47, wherein the setup information includes scan document size information and print paper size information.

49. The program according to claim 47, wherein the scan document size information and print paper size information selected by the operator are acquired from the memory, a copy magnification is determined on the basis of the acquired scan document size information and print paper size information, and an image scanned by the scanner is zoomed on the basis of the determined copy magnifications.

50. The program according to claim 46, wherein a plurality of copy modes is generated from the information, and the plurality of copy modes is displayed on the user interface in correspondence with the information.

51. The program according to claim 50, wherein the plurality of copy modes is generated from information of scan setup and print setup included in the information.

* * * * *

UNITED STATES PATENT AND TRADEMARK OFFICE
CERTIFICATE OF CORRECTION

PATENT NO. : 7,019,857 B2 Page 1 of 1
APPLICATION NO. : 09/819666
DATED : March 28, 2006
INVENTOR(S) : Koichi Abe It is certified that error appears in the above-identified patent and that said Letters Patent is hereby corrected as shown below:

COLUMN 2:
Line 13, "have inadvertantly" should read -- inadvertantly have --.

COLUMN 15:
Line 36, "mode" should read -- modes --.

COLUMN 16:
Line 47, "on" should read -- one --.

COLUMN 19:
Line 19, "information" should be deleted; and
Line 26, "pre stored" should read -- prestored --.

COLUMN 22:
Line 12, "code" should be deleted.

Signed and Sealed this

Twenty-eighth Day of November, 2006

JON W. DUDAS
*Director of the United States Patent and Trademark Office*